(12) United States Patent
Lee

(10) Patent No.: US 11,254,279 B2
(45) Date of Patent: Feb. 22, 2022

(54) CURTAIN AIRBAG APPARATUS

(71) Applicant: HYUNDAI MOBIS CO., LTD., Seoul (KR)

(72) Inventor: Jong Seob Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 12 days.

(21) Appl. No.: 16/845,954

(22) Filed: Apr. 10, 2020

(65) Prior Publication Data
US 2020/0324730 A1  Oct. 15, 2020

(30) Foreign Application Priority Data
Apr. 12, 2019 (KR) .................. 10-2019-0042809

(51) Int. Cl.
| | | |
|---|---|---|
| *B60R 21/232* | (2011.01) | |
| *B60R 21/213* | (2011.01) | |
| *B60R 21/216* | (2011.01) | |
| *B60R 21/261* | (2011.01) | |

(52) U.S. Cl.
CPC .......... *B60R 21/232* (2013.01); *B60R 21/213* (2013.01); *B60R 21/216* (2013.01); *B60R 21/261* (2013.01)

(58) Field of Classification Search
CPC ............................ B60R 21/232; B60R 21/213
See application file for complete search history.

(56) References Cited

U.S. PATENT DOCUMENTS

| | | | | |
|---|---|---|---|---|
| 7,185,914 B2* | 3/2007 | Recker | ................ | B60R 21/232 280/730.2 |
| 7,390,016 B2* | 6/2008 | Noguchi | ............... | B60R 21/232 280/730.2 |
| 7,967,332 B2* | 6/2011 | Karlsson | ............... | B60R 21/214 280/730.2 |
| 8,414,014 B2* | 4/2013 | Nogami | .............. | B60R 21/2338 280/728.2 |
| 8,414,020 B2* | 4/2013 | Beppu | ................ | B60R 21/2334 280/730.2 |
| 8,414,021 B2* | 4/2013 | Tanaka | ................ | B60R 21/232 280/730.2 |
| 8,585,080 B2* | 11/2013 | Trevena | ................ | B60R 21/232 280/730.2 |
| 8,641,088 B2* | 2/2014 | Wiik | ...................... | B60R 21/213 280/730.2 |
| 8,801,030 B2* | 8/2014 | Sugimori | .............. | B60R 21/232 280/730.2 |
| 9,090,223 B2* | 7/2015 | Baumbach | ........... | B60R 21/237 |
| 9,487,175 B2* | 11/2016 | Noma | ................... | B60R 21/237 |
| 9,580,036 B2* | 2/2017 | Choi | ..................... | B60R 21/213 |
| 10,556,565 B2* | 2/2020 | Lee | ....................... | B60R 21/213 |

(Continued)

*Primary Examiner* — Paul N Dickson
*Assistant Examiner* — Joselynn Y Sliteris
(74) *Attorney, Agent, or Firm* — NovoTechIP International PLLC

(57) ABSTRACT

A curtain airbag apparatus may include: a cushion part disposed at the top of a pillar part; one or more guide members connected to the cushion part and configured to fix the cushion part to a vehicle body; and a cushion moving part connected to the cushion part, disposed between the guide members and the vehicle body, fixed to the guide members, and configured to deform the guide members to move the cushion part to an indoor side of the vehicle body, while inflated by gas injected from an inflator.

10 Claims, 10 Drawing Sheets

(56) References Cited

U.S. PATENT DOCUMENTS

| | | | | |
|---|---|---|---|---|
| 10,974,682 B2 * | 4/2021 | Iwata | ............... | B60R 21/201 |
| 2018/0065588 A1 * | 3/2018 | Lee | ............... | B60R 21/213 |
| 2020/0324731 A1 * | 10/2020 | Kang | ............... | B60R 21/213 |
| 2021/0061214 A1 * | 3/2021 | Kim | ............... | B60R 21/233 |

* cited by examiner

CURTAIN AIRBAG APPARATUS

CROSS-REFERENCE TO RELATED APPLICATION

This application claims priority from and the benefit of Korean Patent Application No. 10-2019-0042809, filed on Apr. 12, 2019, which is hereby incorporated by reference for all purposes as if set forth herein.

BACKGROUND

Field

Exemplary embodiments of the present disclosure relate to a curtain airbag apparatus, and more particularly, to a curtain airbag apparatus capable of preventing interference between a cushion part and a pillar part when the cushion part is deployed.

Discussion of the Background

In general, a vehicle includes airbags to protect a passenger. The airbags are installed at various positions according to body parts to be protected.

A curtain airbag is disposed at the tops of front and rear doors in the front-to-rear direction of a vehicle body. The curtain airbag includes a cushion part which is wound in a spiral shape and installed in the vehicle body. Between the front door and the rear door, a pillar part is installed in a top-to-bottom direction.

When an oblique collision of a vehicle occurs, gas generated by an inflator is injected into the cushion part of the curtain airbag. The cushion part is inflated and deployed downward to cover the front and rear doors of the vehicle.

In the conventional curtain airbag, however, the cushion part is packaged at the top of the pillar part. Therefore, when the cushion part is inflated and deployed, the cushion part may interfere with the pillar part. As the cushion part interferes with the pillar part, the cushion part may be damaged or the deployment direction of the cushion part may be changed. Therefore, there is a need for a device capable of solving the problem.

SUMMARY

Various embodiments are directed to a curtain airbag apparatus capable of preventing interference between a cushion part and a pillar part when the cushion part is deployed.

In an embodiment, a curtain airbag apparatus may include: a cushion part disposed at the top of a pillar part; one or more guide members connected to the cushion part and configured to fix the cushion part to a vehicle body; and a cushion moving part connected to the cushion part, disposed between the guide members and the vehicle body, fixed to the guide members, and configured to deform the guide members to move the cushion part to an indoor side of the vehicle body, while inflated by gas injected from an inflator.

The cushion moving part may be folded and disposed between the guide members and the vehicle body.

The cushion moving part may have one or more fixing slits through which the cushion moving part is fitted and fixed to the guide members.

One guide member may be connected between the cushion part and the cushion moving part, and one fixing slit may be formed at the edge of the cushion moving part so as to correspond to the guide member.

A plurality of guide members may be connected between the cushion part and the cushion moving part, and a plurality of fixing slits may be formed at the edge of the cushion moving part so as to correspond one-to-one to the guide members.

The curtain airbag apparatus may further include a guide sewed part formed between the cushion part and the cushion moving part and configured to restrict the cushion moving part from inflating in the thickness direction of the cushion part, when gas is injected from the inflator.

The guide sewed part may be an inactive area which is not inflated in the thickness direction when the cushion part is inflated.

A first communication hole may be formed on one side of the guide sew part such that the cushion part and one side of the cushion moving part communicate with each other, and a second communication hole may be formed on the other side of the guide sewed part such that the cushion part and the other side of the cushion moving part communicate with each other.

When the cushion part is wound in the counter clockwise direction based on the guide members and the guide members are fixed to the vehicle body, the first and second communication holes may be disposed at the top of the cushion part.

The gas injected into the cushion moving part may be first supplied to an outer portion of the cushion part though the first and second communication holes, such that the cushion part is unwound and deployed in the clockwise direction.

The cushion part may be connected to a cushion cover part to cover the wound cushion part.

In accordance with the embodiments of the present disclosure, since the cushion moving part is fixed to the guide member, a separate part or process may not be applied in order to fix the cushion moving part to the guide member. Therefore, it is possible to prevent an increase in the number of parts and to reduce the assembling time.

Furthermore, since the guide member is deformed toward the indoor side by the inflation force of the cushion moving part, it is possible to prevent the cushion part from being caught on or interfering with the pillar part at the initial state of the deployment of the cushion part.

DETAILED DESCRIPTION OF THE ILLUSTRATED EMBODIMENTS

Hereinafter, a curtain airbag apparatus will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
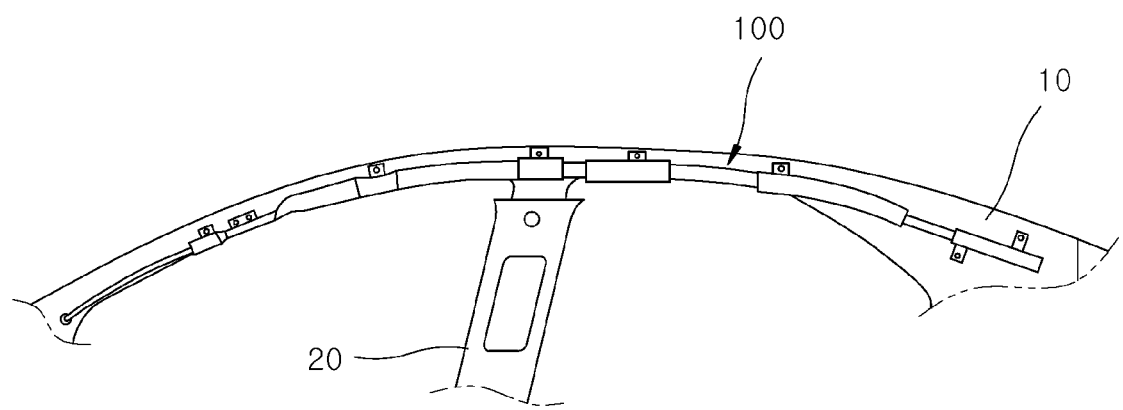
FIG. 1 is a configuration diagram schematically illustrating that a curtain airbag apparatus in accordance with an embodiment of the present disclosure is installed in a vehicle body.
Figure 2:
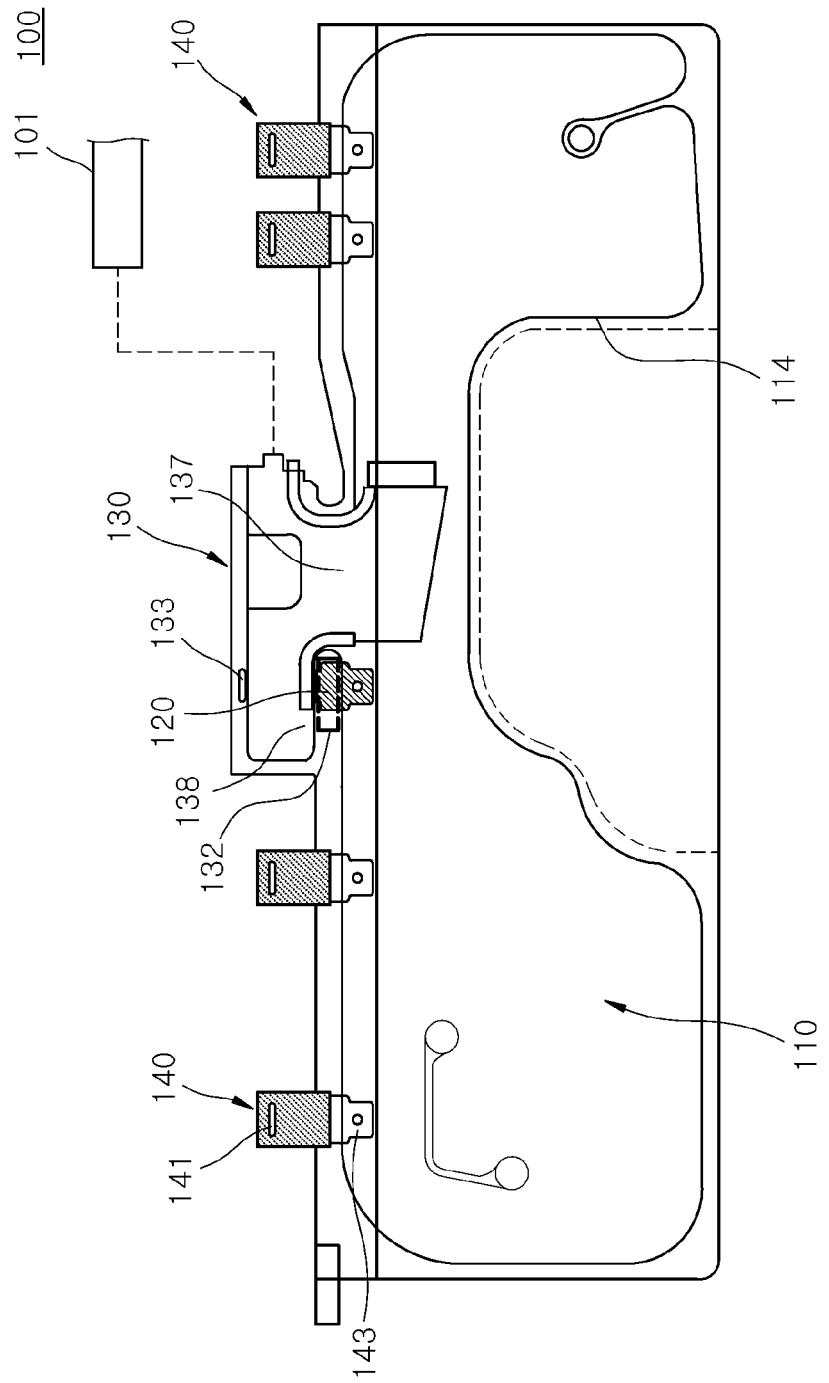
FIG. 2 is a plan view schematically illustrating that the curtain airbag apparatus in accordance with the embodiment of the present disclosure is unfolded.
Figure 3:
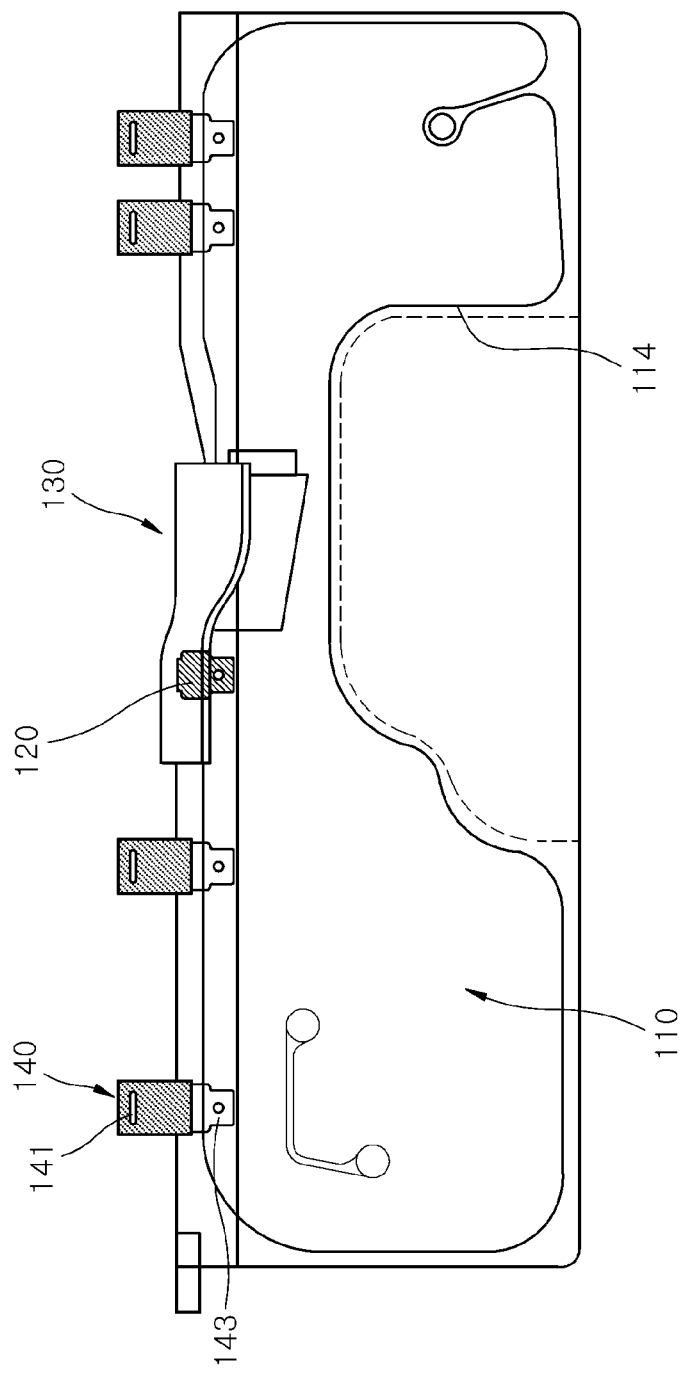
FIG. 3 is a plan view schematically illustrating that a cushion moving part is folded in the curtain airbag apparatus in accordance with the embodiment of the present disclosure.
Figure 4:
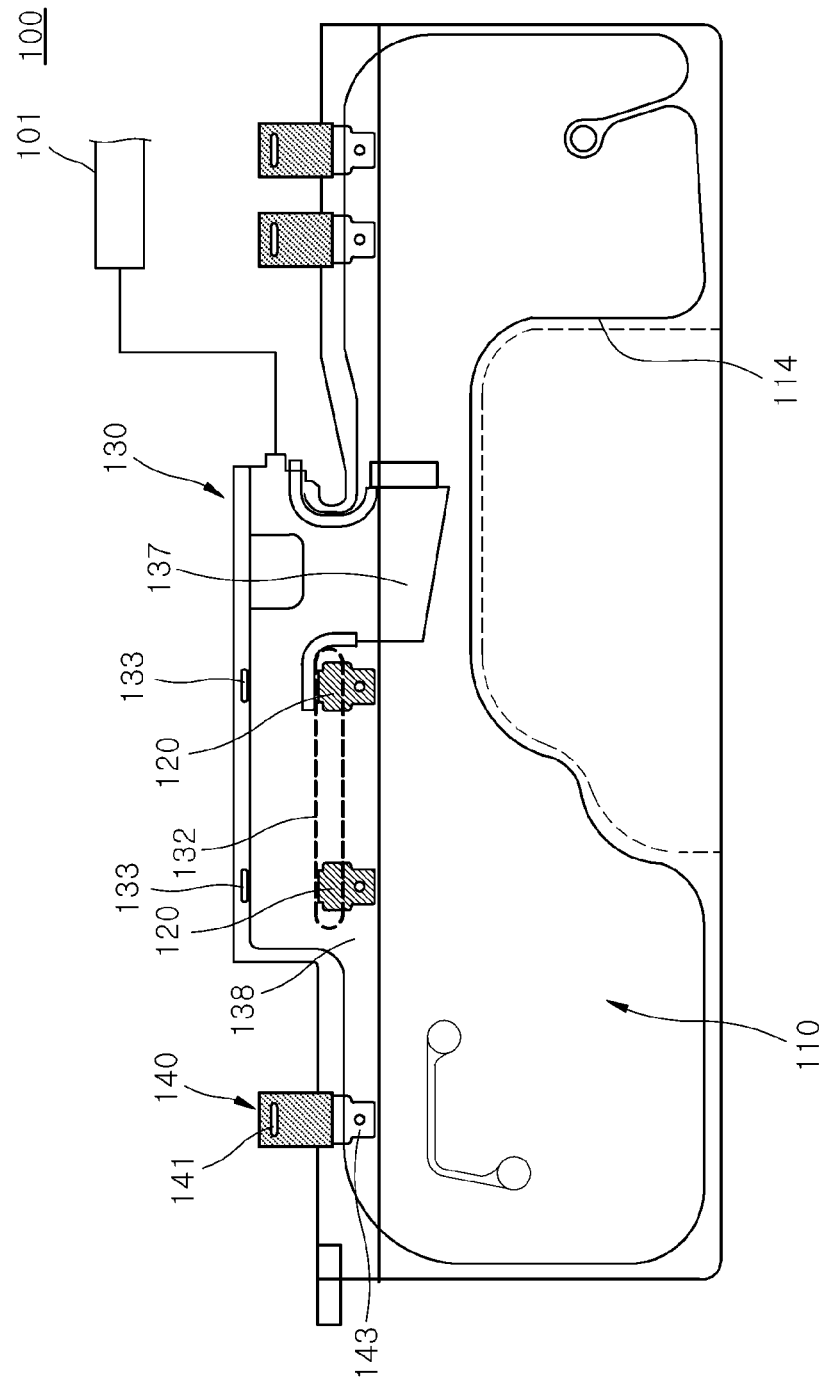
FIG. 4 is a plan view schematically illustrating that two guide members are installed in the curtain airbag apparatus in accordance with the embodiment of the present disclosure.
Figure 5:
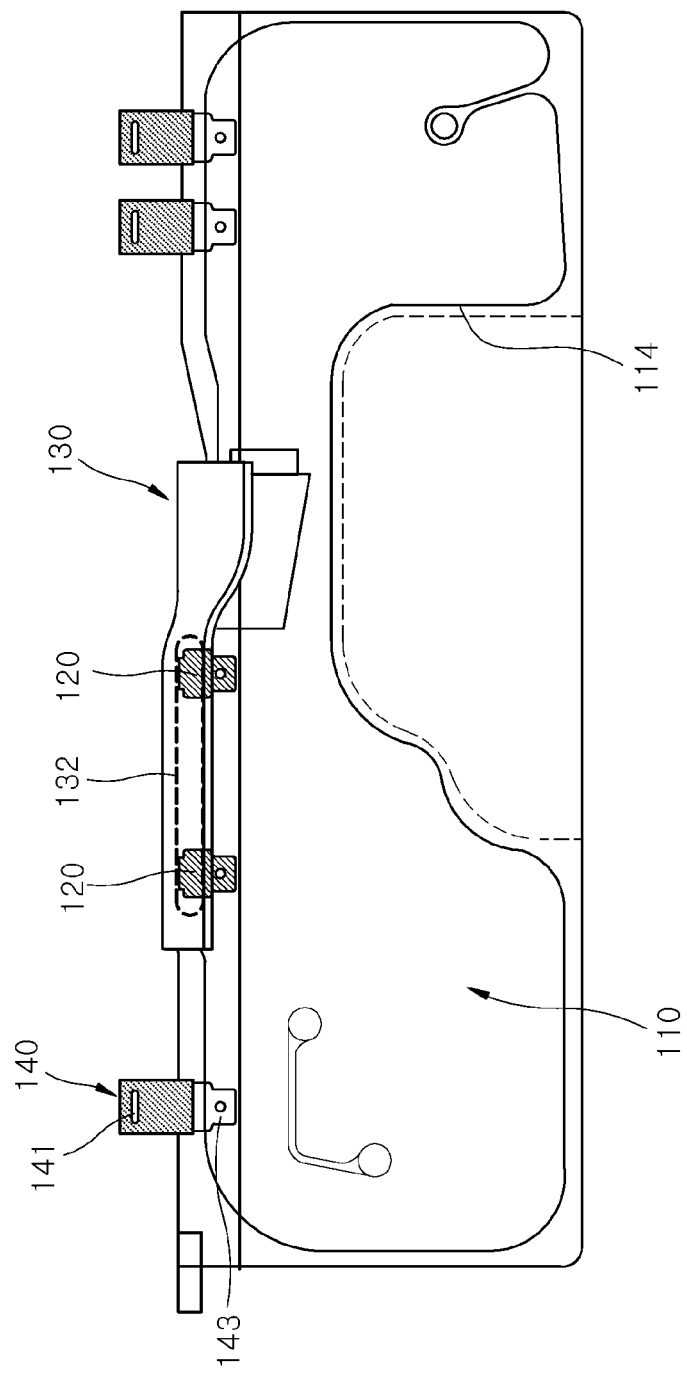
FIG. 5 is a plan view schematically illustrating that the two guide members are installed and the cushion moving part is folded in the curtain airbag apparatus in accordance with the embodiment of the present disclosure.
Figure 6:
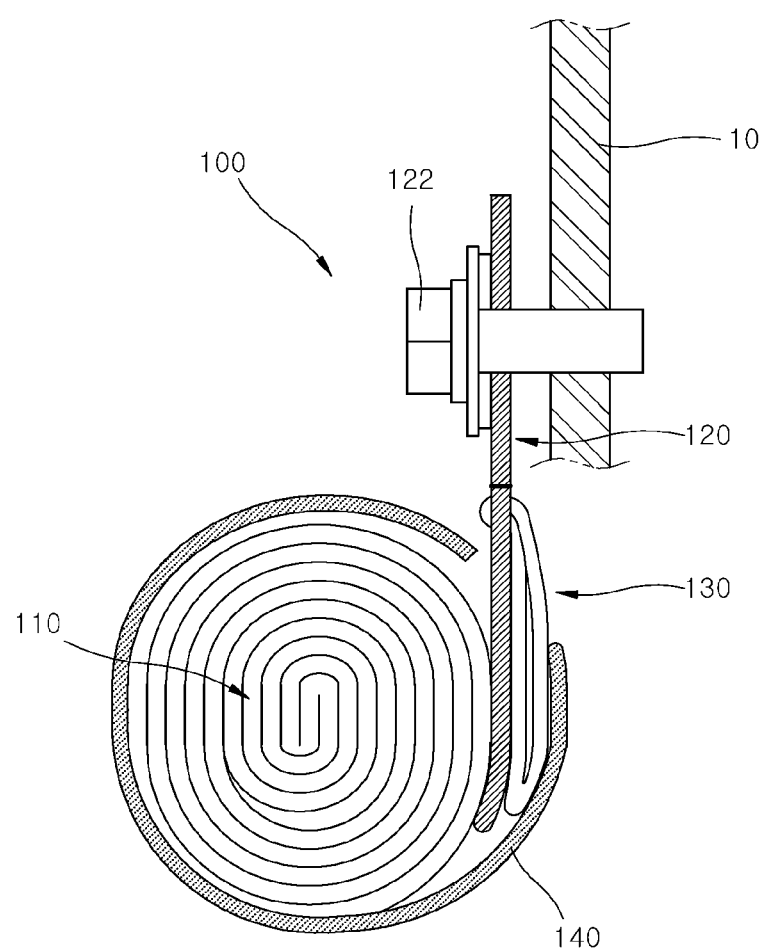
FIG. 6 is a side view schematically illustrating that a cushion part is wound and installed in the vehicle body in the curtain airbag apparatus in accordance with the embodiment of the present disclosure.
Figure 7:
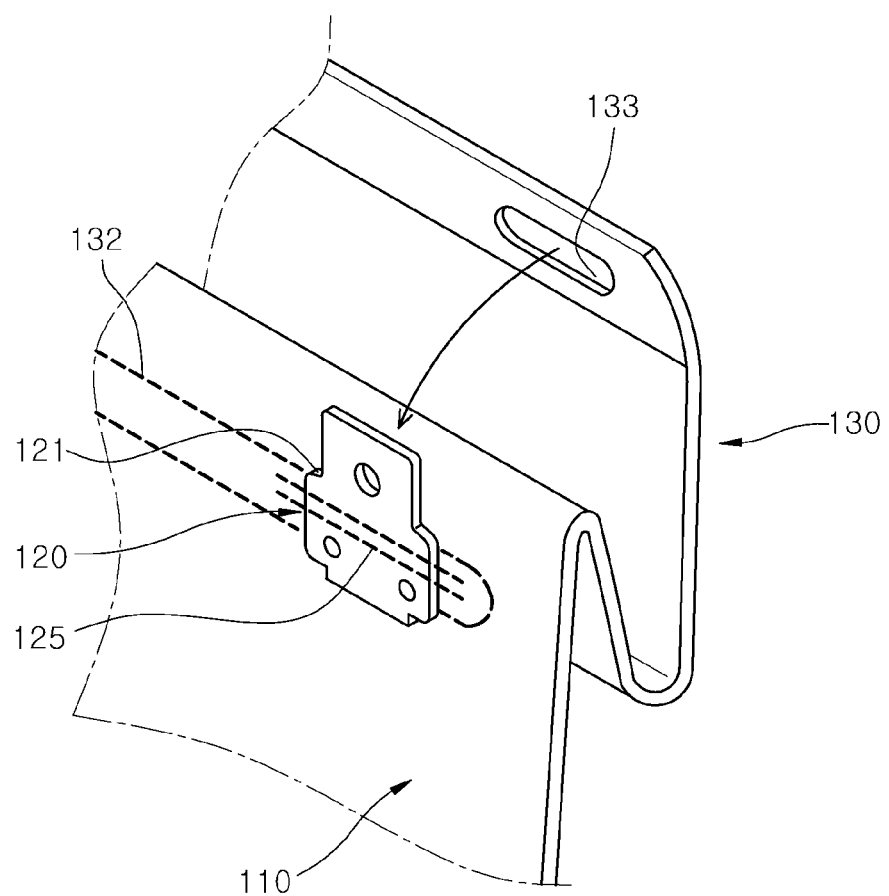
FIG. 7 is a perspective view schematically illustrating that a fixing slit of the cushion moving part is fitted to the guide member in the curtain airbag apparatus in accordance with the embodiment of the present disclosure.

FIG. 1 is a configuration diagram schematically illustrating that a curtain airbag apparatus in accordance with an embodiment of the present disclosure is installed in a vehicle body, FIG. 2 is a plan view schematically illustrating that the curtain airbag apparatus in accordance with the embodiment of the present disclosure is unfolded, FIG. 3 is a plan view schematically illustrating that a cushion moving part is folded in the curtain airbag apparatus in accordance with the embodiment of the present disclosure, FIG. 4 is a plan view schematically illustrating that two guide members are installed in the curtain airbag apparatus in accordance with the embodiment of the present disclosure, FIG. 5 is a plan view schematically illustrating that the two guide members are installed and the cushion moving part is folded in the curtain airbag apparatus in accordance with the embodiment of the present disclosure, FIG. 6 is a side view schematically illustrating that a cushion part is wound and installed in the vehicle body in the curtain airbag apparatus in accordance with the embodiment of the present disclosure, and FIG. 7 is a perspective view schematically illustrating that a fixing slit of the cushion moving part is fitted to the guide member in the curtain airbag apparatus in accordance with the embodiment of the present disclosure.

Referring to FIGS. 1 to 7, a curtain airbag apparatus 100 in accordance with an embodiment of the present disclosure may include a cushion part 110, a guide member 120 and a cushion moving part 130.

The curtain airbag apparatus 100 is disposed at the tops of front and rear doors (not illustrated) in a front-to-rear direction. The curtain airbag apparatus 100 is wound and installed in a roll shape.

The cushion part 110 is connected to an inflator 101 through the cushion moving part 130. A head liner 30 (see FIG. 9) is installed on the indoor side of the curtain airbag apparatus 100. The head liner 30 closes the indoor side of the curtain airbag apparatus 100.

A pillar part 20 is installed at the bottoms of the head liner 30 and the curtain airbag apparatus 100. The pillar part 20 is vertically disposed on either side of a vehicle body 10 so as to connect the ceiling and bottom of the vehicle body 10.

The pillar part 20 includes a front pillar (not illustrated) installed on the front side of the vehicle body 10, a center pillar (not illustrated) disposed between the front and rear doors, and a rear pillar (not illustrated) installed on the rear side of the vehicle body 10.

The guide member 120 and the cushion moving part 130 in accordance with the embodiment of the present disclosure may be applied to some or all of the front pillar, the center pillar and the rear pillar.

The cushion part 110 is disposed at the top of the pillar part 20. The cushion part 110 is wound in a roll shape and packaged. At this time, the cushion part 110 is wound in the CCW (Counter Clock Wise) direction based on the guide member 120.

As gas is injected from the inflator 101, the cushion part 110 is deployed to cover both sides of the vehicle body 10.

The cushion part 110 has an inactive part 114 to limit the inflation thickness of the cushion part 110. The inactive part 114 has a structure in which two layers of fabric are attached to each other, such that gas is not introduced into the inactive part 114.

The guide member 120 is connected to the cushion part 110, and fixes the cushion part 110 to the vehicle body 10. The guide member 120 is fixed to the vehicle body 10 by a fastening member 122. The guide member 120 may be formed in a plate shape. The guide member 120 may be formed of a synthetic resin material or metal material which can be elastically deformed.

Various shapes of members such as a bolt and clip may be applied as the fastening member 122, as long as the members can fix the guide member 120 to the vehicle body 10. The fastening member 122 fixes the top of the guide member 120 to the vehicle body 10. Therefore, the top of the guide member 120 becomes a fixed end, and the bottom of the guide member 120 becomes a free end.

The cushion moving part 130 is connected to the cushion part 110, disposed between the guide member 120 and the vehicle body 10, and fixed to the guide member 120. The cushion moving part 130 deforms the guide member 120 to move the cushion part 110 to the indoor side of the vehicle body 10, while inflated by the gas injected from the inflator 101.

Since the cushion moving part 130 is disposed between the guide member 120 and the vehicle body 10, the wound cushion part 110 may be installed in close contact with the vehicle body 10, which makes it possible to reduce the installation space.

As the guide member 120 is deformed toward the indoor side by the inflation force of the cushion moving part 130, the guide member 120 is moved away from the vehicle body 10. Therefore, the cushion part 110 fixed to the guide member 120 is also moved toward the center of the vehicle in the widthwise direction.

As the cushion part 110 is unfolded and deployed to the indoor side, the cushion part 110 pushes the head liner 30 to the indoor side. Therefore, it is possible to prevent the cushion part 110 from being caught on or interfering with the top of the pillar part 20 at the initial stage of the deployment of the cushion part 110.

The cushion moving part 130 deforms the guide member 120 to bend toward the indoor side at the initial stage of the inflation of the cushion part 110. After the cushion part 110 passes between the head liner 30 and the pillar part 20, the cushion moving part 130 may be separated from the guide member 120.

Since the size of the cushion moving part 130 is much smaller than the size of the cushion part 110, the cushion part 110 is inflated after the cushion moving part 130 is inflated. Therefore, the deployment of the cushion part 110 is delayed by the time during which the cushion moving part 130 is inflated. Furthermore, since the cushion part 110 is moved toward the indoor side by the deformation of the guide member 120 and then deployed, it is possible to prevent the interference between the cushion part 110 and the top of the pillar part 20 at the initial stage of the deployment of the cushion part 110.

The cushion moving part 130 protrudes from the top of the cushion part 110. The cushion moving part 130 may be formed in a rectangular shape parallel to the front-to-rear direction of the vehicle body 10 at the top of the cushion part 110. The cushion moving part 130 is formed as one body with the cushion part 110. The cushion moving part 130 may be manufactured separately from the cushion part 110, and then connected to the top of the cushion part 110.

The cushion moving part 130 is folded and disposed between the guide member 120 and the vehicle body 10 (see FIGS. 6 and 7). At this time, the cushion moving part 130 may include two or more layers overlapping each other. Since the cushion moving part 130 has a structure in which two or more layers overlap each other, the cushion moving part 130 may be inflated in a U-shape, and the thickness of the cushion moving part 130 may be increased. Therefore, the bending deformation of the guide member 120 toward the indoor side may be increased.

The cushion moving part 130 has a fixing slit 133 through which the cushion moving part 130 is fitted and fixed to the guide member 120. At this time, the guide member 120 has a locking step 121 to which the fixing slit 133 is locked so as not to move downward.

Since the cushion moving part 130 is fitted and fixed to the guide member 120, a separate part or process may not be applied to fix the cushion moving part 130 to the guide member 120. Therefore, it is possible to prevent an increase in the number of parts and to shorten the assembling time.

After the cushion part 110 passes between the head liner 30 and the pillar part 20, the cushion part 110 is not caught on the top of the pillar part 20. Therefore, after the cushion part 110 is deployed to the indoor side, the fixing slit 133 may be torn or not.

One guide member 120 is connected between the cushion part 110 and the cushion moving part 130, and one fixing slit 133 is formed at the edge of the cushion moving part 130 so as to correspond to the guide member 120 (see FIGS. 2 and 3). Since one guide member 120 and one fixing slit 133 are formed, the structure of the curtain airbag apparatus 100 can be simplified.

Furthermore, a plurality of guide members 120 may be connected between the cushion part 110 and the cushion moving part 130, and a plurality of fixing slits 133 may be formed at the edge of the cushion moving part 130 so as to correspond one-to-one to the guide members 120 (see FIGS. 4 and 5). Since the plurality of fixing slits are fitted and fixed to the plurality of guide members 120, the guide members 120 can be more stably fixed to the fixing slits 133.

Between the cushion part 110 and the cushion moving part 130, a guide sewed part 132 is formed to restrict the cushion moving part 130 from inflating in the thickness direction of the cushion part 110, when gas is injected from the inflator 101.

The guide sewed part 132 is disposed along the boundary between the cushion part 110 and the cushion moving part 130. The guide sewed part 132 is an inactive area which is not inflated in the thickness direction when the cushion part 110 is inflated. Since the edge of the guide member 120 is not inflated by the guide sewed part 132, it is possible to prevent the guide member 120 from being separated from the vehicle body 10 when the cushion part 110 and the cushion moving part 130 are inflated.

The guide sewed part 132 has a first communication hole 137 formed on one side thereof and a second communication hole 138 formed on the other side thereof. The cushion part 110 communicates with one side of the cushion moving part 130 through the first communication hole 137, and communicates with the other side of the cushion moving part 130 through the second communication hole 138. The gas injected into the cushion moving part 130 flows to one side of the cushion part 110 through the first communication hole 137, and flows to the other side of the cushion part 110 through the second communication hole 138.

At this time, when the cushion part 110 is wound in the CCW direction based on the guide member 120 and the guide member 120 is fixed to the vehicle body 10, the first and second communication holes 137 and 138 are disposed at the top of the cushion part 110. At this time, since the gas injected into the cushion moving part 130 is first supplied to the outer portion of the cushion part 110 through the first and second communication holes 137 and 138, the cushion part 110 is unwound and deployed in the CW (Clock Wise) direction. Therefore, since the cushion part 110 is unwound and deployed toward the opposite side of the pillar part 20 when the cushion part 110 is deployed, it is possible to prevent the cushion part 110 from interfering with the pillar part 20.

A fixing sewed part 125 (see FIG. 7) is formed to connect the guide member 120 to the guide sewed part 132. Since the fixing sewed part 125 is connected to the guide sewed part 132, the guide sewed part 132 and the fixing sewed part 125 may be formed by the same sewing process. Therefore, it is possible to prevent an increase in the manufacturing time of the curtain airbag apparatus 100.

The cushion part 110 is connected to a cushion cover part 140 to cover the wound cushion part 110. The cushion cover part 140 is connected to the top of the edge of the cushion part 110. The cushion cover part 140 has a cover hole 141 which is fitted to a mounting tab 143 fixed to the vehicle body 10. The cushion cover part 140 may be sewed to the edge of the cushion part 110 by a cover sewed part. The cushion cover part 140 prevents the packaged cushion part 110 from being unwound. A plurality of cushion cover parts 140 may be disposed in the longitudinal direction of the wound cushion part 110. The cushion cover part 140 is formed of the same material as the cushion part 110, and separated from the mounting tab 143 when the cushion part 110 is inflated.

The deployment process and operation of the curtain airbag apparatus in accordance with the embodiment of the present invention, which has the above-described configuration, will be described.

Figure 8:
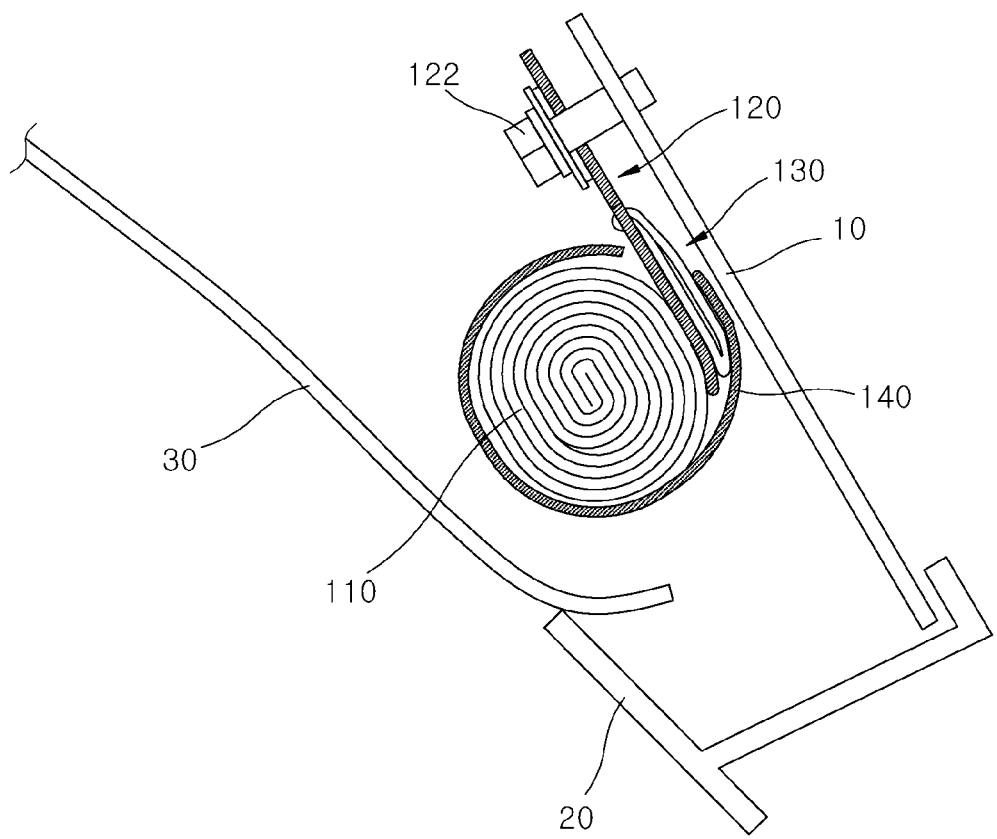
FIG. 8 is a side view schematically illustrating that the curtain airbag apparatus in accordance with the embodiment of the present invention is installed at the top of the pillar part.
Figure 9:
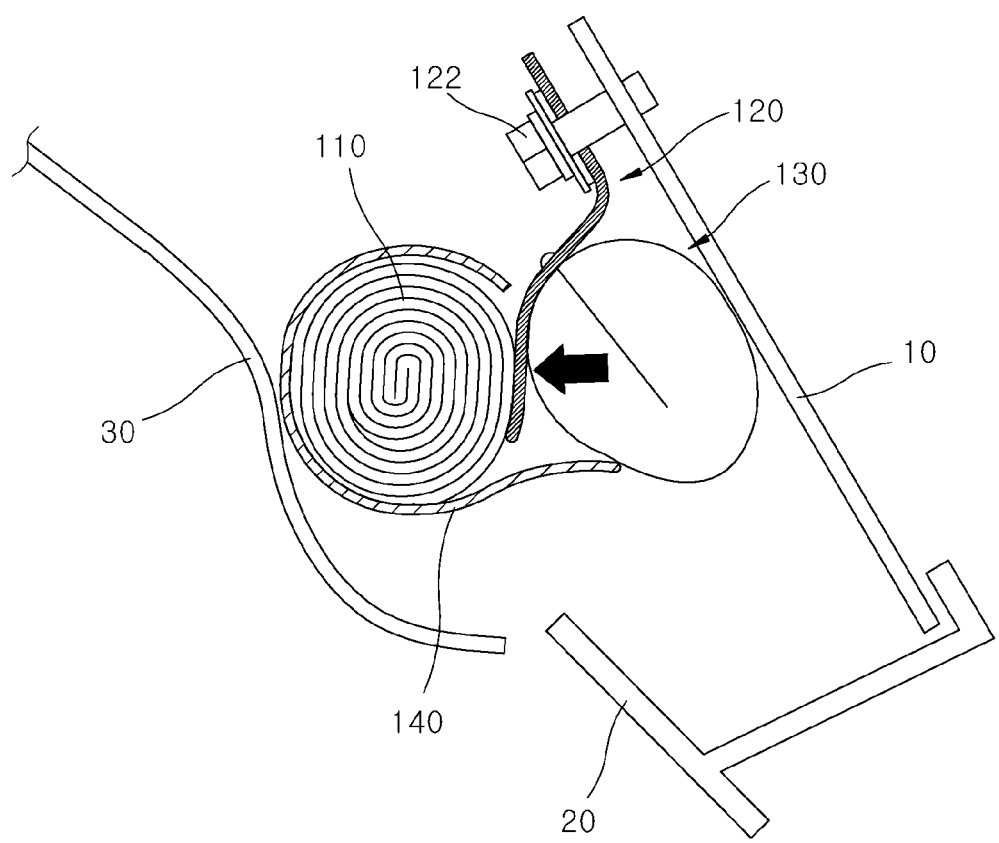
FIG. 9 is a side view illustrating that the cushion moving part in the curtain airbag apparatus in accordance with the embodiment of the present invention is inflated to move the wound cushion part to the opposite side of the vehicle body.
Figure 10:
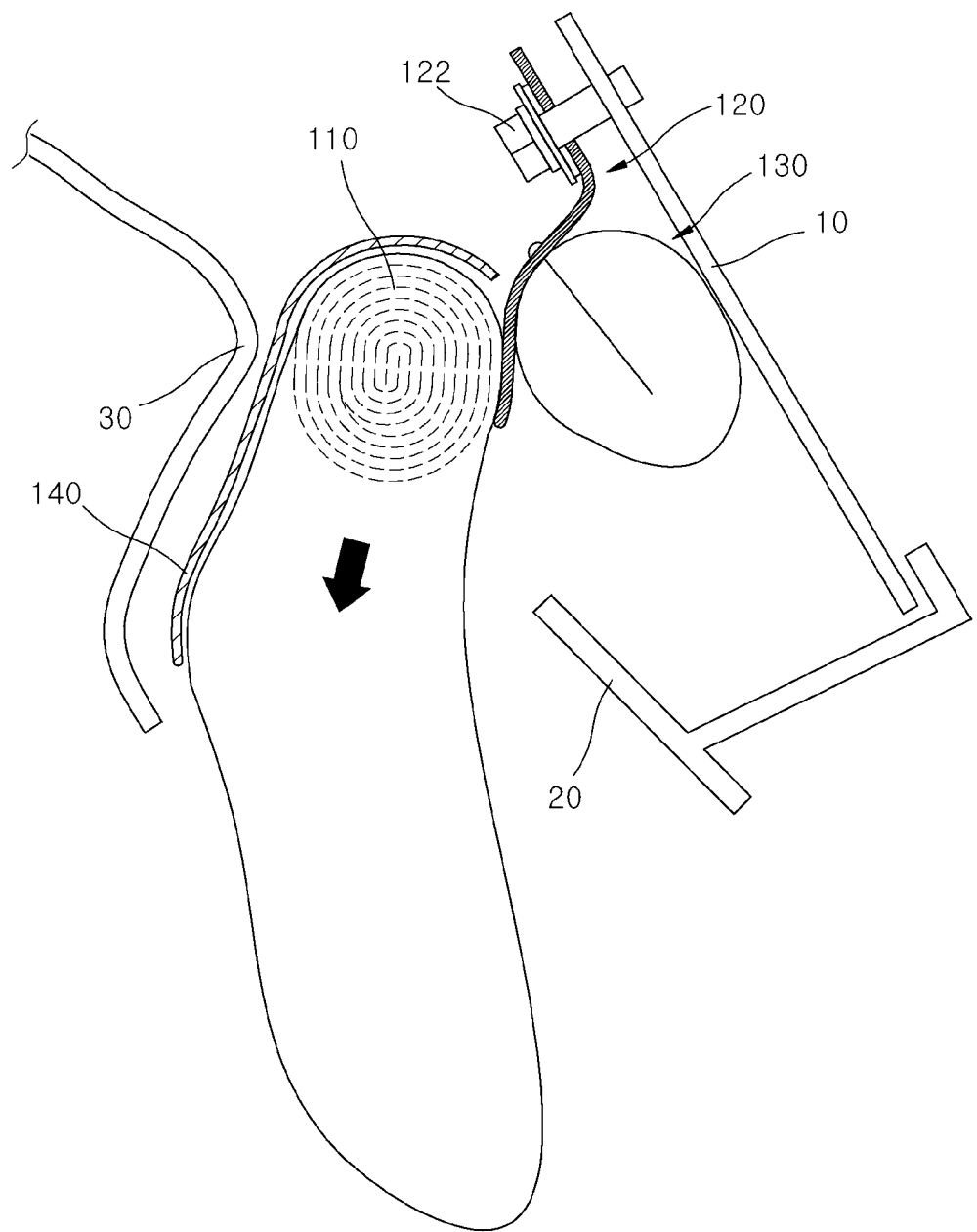
FIG. 10 is a side view illustrating that the cushion part is deployed to the indoor side after the cushion moving part is inflated in the curtain airbag apparatus in accordance with the embodiment of the present invention.

FIG. 8 is a side view schematically illustrating that the curtain airbag apparatus in accordance with the embodiment of the present invention is installed at the top of the pillar part, FIG. 9 is a side view illustrating that the cushion moving part in the curtain airbag apparatus in accordance with the embodiment of the present invention is inflated to move the wound cushion part to the opposite side of the vehicle body, and FIG. 10 is a side view illustrating that the cushion part is deployed to the indoor side after the cushion moving part is inflated in the curtain airbag apparatus in accordance with the embodiment of the present invention.

Referring to FIGS. 8 to 10, when the vehicle collides, the inflator 101 is driven. Gas generated by the inflator 101 is injected to the cushion moving part 130. Since the cushion moving part 130 is inflated by the gas and the bottom of the guide member 120 serves as a free end which is not fixed to the vehicle body 10, the guide member 120 is bent toward the indoor side by the inflation force of the cushion moving part 130. When the guide member 120 is bent toward the indoor side, the packaged cushion part 110 connected to the guide member 120 is moved to the indoor side.

At this time, since the packaged cushion part 110 is moved to the indoor side such that the inflation pressure of the cushion moving part 130 is applied to the head liner 30, the head liner 30 is bent to the indoor side. As the head liner 30 is bent toward the indoor side, a gap is formed between the head liner 30 and the top of the pillar part 20. At this time, a slight amount of gas is injected into the packaged cushion part 110.

As the gas of the cushion moving part 130 is injected into the cushion part 110 through the first and second communication holes 137 and 138, the outer portion of the cushion part 110 is inflated. As the outer portion of the cushion part 110 is inflated, the cushion cover part 140 is separated from the mounting tab 143. As the cushion cover part 140 is separated, the cushion part 110 starts to be deployed.

The cushion part 110 is wound in the CCW direction based on the guide member 120, and the first and second communication holes 137 and 138 are disposed at the top of the cushion part 110. At this time, since the gas injected into the cushion moving part 130 is first supplied to the outer portion of the cushion part 110 through the first and second communication holes 137 and 138, the cushion part 110 is unwound and deployed in the CW (Clock Wise) direction. Therefore, since the cushion part 110 is unwound and deployed toward the opposite side of the pillar part 20 at the initial stage of the deployment of the cushion part 110, the cushion part 110 can be prevented from being caught on or interfering with the pillar part 20.

The cushion part 110 is deployed to pass through the gap between the head liner 30 and the pillar part 20. At this time, the head liner 30 is further bent by the inflation pressure of the cushion part 110. Then, the cushion part 110 is continuously unwound in the CW direction to cover the door. Therefore, a passenger can be protected by the cushion part 110.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A curtain airbag apparatus comprising:
    a cushion part disposed at a top of a pillar part;
    a guide member connected to the cushion part and configured to fix the cushion part on a vehicle body; and
    a cushion moving part connected to the cushion part and the guide member, disposed between the guide member and the vehicle body, and configured to deform the guide member to move the cushion part to an indoor side of the vehicle body when inflated by gas injected from an inflator,
    wherein the cushion moving part has one or more fixing slits through which the cushion moving part is fitted and fixed to the guide member.

2. The curtain airbag apparatus of claim 1, wherein the cushion moving part is folded to have a plurality of layers between the guide member and the vehicle body and configured to unfold when inflated.

3. The curtain airbag apparatus of claim 1, wherein:
    the guide member is connected between the cushion part and the cushion moving part, and
    the cushion moving part comprises a fixing slit located at an edge thereof and corresponding to the guide member.

4. The curtain airbag apparatus of claim 1, wherein the guide member is connected between the cushion part and the cushion moving part, and comprises a fixing slit formed at an edge of the cushion moving part.

5. The curtain airbag apparatus of claim 1, further comprising a guide sewed part formed between the cushion part and the cushion moving part and configured to restrict the cushion moving part from inflating in the thickness direction of the cushion part when the gas is injected from the inflator.

6. The curtain airbag apparatus of claim 5, wherein the guide sewed part is an inactive area which is not inflated in the thickness direction when the cushion part is inflated.

7. The curtain airbag apparatus of claim 5, wherein:
    a first communication hole is positioned at a first side of the guide sewed part such that the cushion part and one side of the cushion moving part communicate with each other, and
    a second communication hole is positioned at a second side of the guide sewed part such that the cushion part and the other side of the cushion moving part communicate with each other.

8. The curtain airbag apparatus of claim 7, wherein when the cushion part is wound in the counterclockwise direction based on the guide member and the guide member is fixed to the vehicle body, the first and second communication holes are disposed at the top of the cushion part.

9. The curtain airbag apparatus of claim 8, wherein the gas injected into the cushion moving part is first supplied to an outer portion of the cushion part though the first and second communication holes, such that the cushion part is unwound and deployed in the clockwise direction.

10. The curtain airbag apparatus of claim 1, wherein the cushion part is connected to a cushion cover part to cover the wound cushion part.

* * * * *